United States Patent Office 3,514,897
Patented June 2, 1970

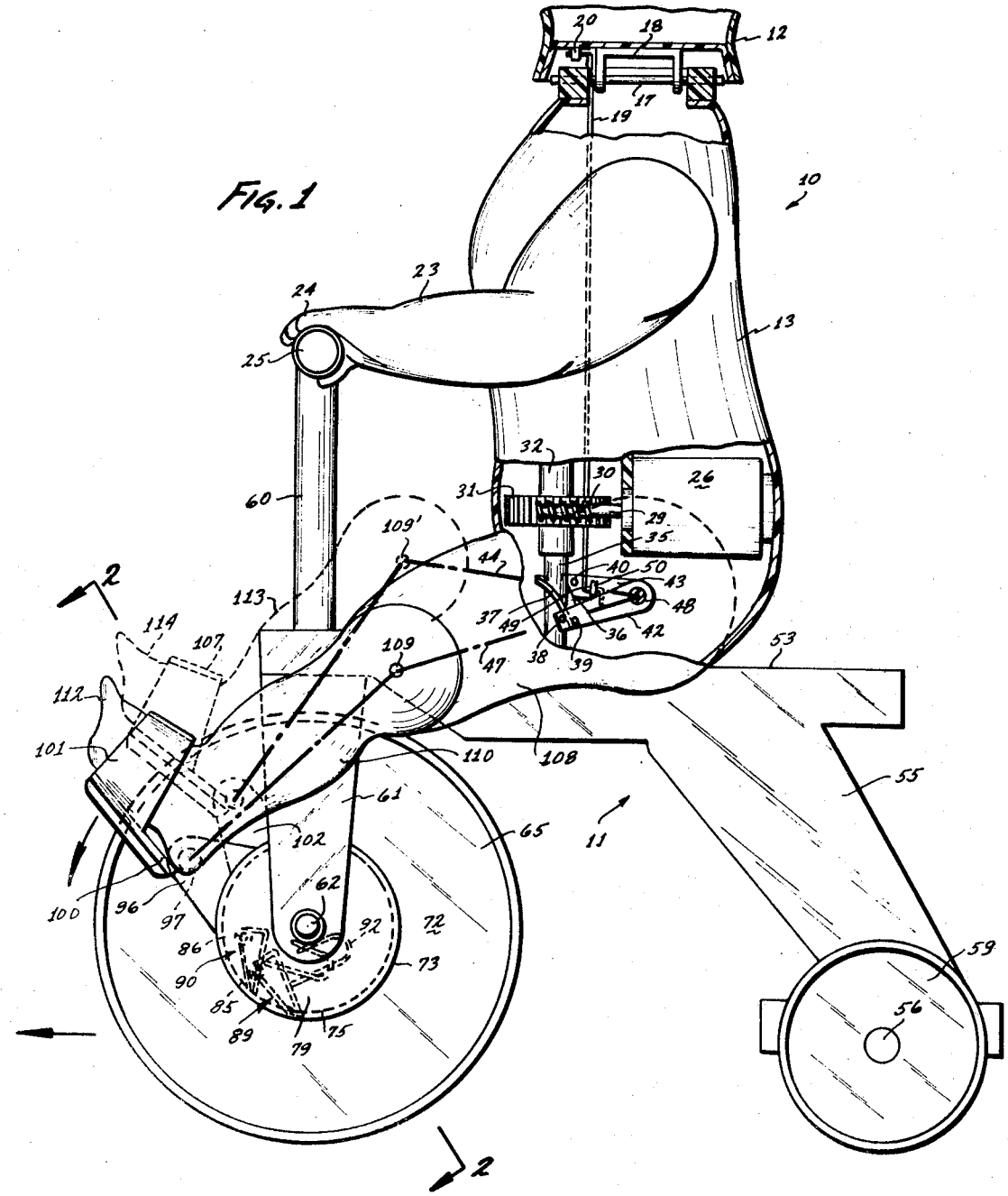

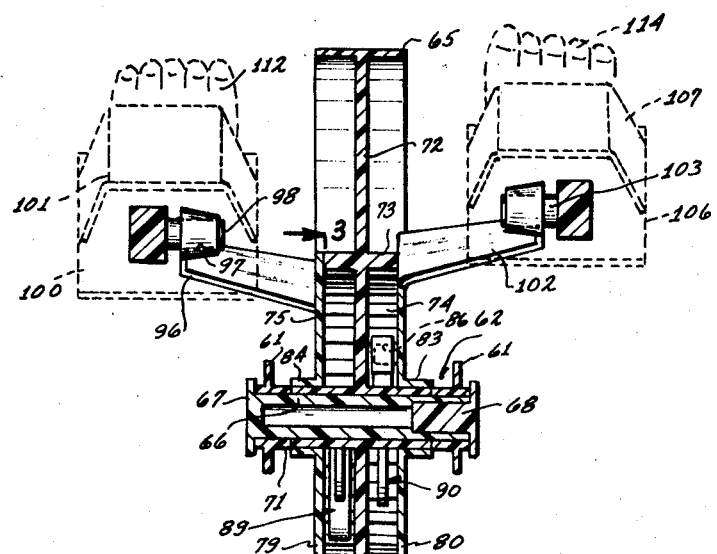

3,514,897
DOLL-DRIVEN WHEEL TOY AND RATCHET DEVICE FOR DRIVING SAME
Raymond J. Douglas, Los Angeles, Cedric E. Iwasaki, Hermosa Beach, and Joseph Kossoff, Hawthorne, Calif., assignors to Mattel, Inc., Hawthorne, Calif., a corporation of California
Filed Feb. 8, 1968, Ser. No. 704,123
Int. Cl. A63h 17/18
U.S. Cl. 46—109     3 Claims

ABSTRACT OF THE DISCLOSURE

A figure toy in combination with a wheel driven toy, the figure toy having two legs and a body, means for driving the legs in opposite directions alternately in a pedalling motion, pedal means in driving connections in one of the wheels of the wheel driven toy, the legs of the figure toy being in a pedalling relationship with the pedal means, and the pedal means being operatively connected to drive the wheel by a one way drive means adapted to drive the wheel in accordance with movements of the doll legs in one of said opposite directions, the drive means permitting a free return of the pedal means, after they have been moved a predetermined limited amount for driving the wheel, to a predetermined position where the drive movement starts, the return movement being in accordance with the alternate movement of said legs in the other of the opposite directions.

A ratchet and pawl combination for a pair of members adapted to rotate on a common axis in which the ratchet wheel is on one of the members and the pawl has an arm pivotally mounted at one end on the other of the members so as to be in engaging alignment with the ratchet, the other end of the arm defining the pawl, and a U-shaped flexible member on said arm and having a portion thereof adapted to ride on a generally cylindrical support on one of the members so as to bias the pawl into contact with the ratchet teeth.

BACKGROUND OF THE INVENTION

The doll driven tricycle herein advantageously utilizes a doll of the character disclosed in Douglas et al. application Ser. No. 699,400, entitled A Self-Propelled Figure Toy Combination, filed Jan. 22, 1968, and which disclosure is incorporated by reference herein.

The invention relates generally to self-propelled figure toys and more particularly, to such toys which are adapted to drive a vehicle.

The detailed drive means which drives the figure toy herein is specifically disclosed in the above co-pending application which is incorporated here by reference for purposes of disclosure.

SUMMARY OF THE INVENTION

The invention is comprised of a figure toy having a drive means for driving its legs in combination with a wheel driven vehicle in which the driven legs propel the vehicle. The invention further includes pedal means on a driving wheel of a vehicle, the pedal means being in driving connection with the wheel, the driving connection being formed of a ratchet and pawl for each pedal means. The actions of the legs of the toy figure are adapted to move the pedals a predetermined limited amount in the driving direction and during which the ratchet and pawl are in a driving engagement. The movement of the legs in one direction moves the pedals in a driving direction and the movement of the legs in another direction moves the pedals in a non-driving direction. During the latter movement of the pedals the ratchet and pawl permit a reverse or resetting movement of the pedal without affecting the movement of the wheel.

An object of the invention is to provide an improved figure toy in combination with an improved wheel driven vehicle in which the means to drive the legs of the figure toy drives the vehicle.

It is another object of the invention to provide in a toy combination, as described in the previous paragraph, a figure toy, having arms, legs and a head supported on a vehicle, and in which driving means which reciprocate the legs are adapted to drive pedals on a tricycle through a predetermined limited arc so as to drive the vehicle.

It is still another object of the invention to provide a toy combination, as described in the preceding paragraphs, in which a doll, having power reciprocated legs, is adapted to be seated on a tricycle and to pedal the same in a very realistic manner to move the vehicle along a driving surface.

It is a further object of the invention to provide toy combination, as described in the preceding paragraphs, in which further realism is induced into the combination by providing the doll with a rockable head which is rocked from side to side to simulate the movement of a child's head, the drive means being connected to the head so as to rock it slightly when the legs are moved to pedal the tricycle.

It is a still further object of the invention to provide in a toy combination, as described in the preceding paragraphs, a ratchet and pawl drive means as a driving connection between the pedals and the wheel which drives the vehicle. As the pedals are moved alternately through a limited arc by the action of the legs, one of the pedals drives the wheel by an engagement of the pawl in the ratchet. The other pedal during this period is moved to reset the pedal to a new driving position. The latter movement is accomplished by the movement of the leg which is not driving the vehicle. Thus there is provided a one way drive for each pedal through the limited arc and when one pedal is driving, being moved downwardly in a forward direction the other pedal is being moved upwardly in a rearward direction without affecting the rotation of the wheel.

It is another object of the invention to provide an improved ratchet and pawl combination in which the pawl is biased into contact with the teeth of the ratchet by means of a spring integrally formed with the pawl.

Further objects and advantages of the invention will be apparent from the following part of the specification wherein small details have been described for the competence of disclosure.

BRIEF DESCRIPTION OF THE DRAWINGS

Referring to the accompanying drawings, which are for illustrative purposes:

FIG. 1 is a side elevation view of a self-propelled figure toy in combination with a tricycle, constituting a presently preferred embodiment of the invention;

FIG. 2 is a cross-sectional view, taken as indicated along line 2—2 of FIG. 1; and FIG. 3 is a fragmentary view, taken as indicated along the line 3—3 of FIG. 2.

DESCRIPTION OF THE PREFERRED EMBODIMENT

Referring again to the drawings, there is shown in FIG. 1 is a self-propelled figure toy, generally designated as 10 in combination with a tricyle designated 11. The figure toy 10 is provided with a head and leg driving means disclosed in our co-pending application, referred to above, and incorporated by reference here.

The toy 10 has a doll's head 12 secured to a torso 13. The head is supported in part on a pin 17 secured in the torso and which is journaled in a bracket 18 secured in the head. The head is spaced from the torso a slight amount so that it can be rocked from side to side on the pin 17. Mechanical rocking to achieve realistic movement of the doll is made possible by a vertically moving rod 19 offset from the center of the doll, in front or rear view, connected to the head at 20 to move it up and down by action of the driving means and around the rod 17 which is centrally positioned fore and aft within the head.

Extending forwardly of the torso are the two arms, only the arm 23 being shown. The arms are pivotally secured to the torso 13 and have hands 24 having resilient fingers and thumbs, realistically and removably secured to a handle 25 on the tricycle so as to substantially hold the figure toy, having the configuration of a doll thereon.

In the lower part of the torso, there is a battery driven electric motor 26 having a drive shaft 29 and a worm 30 on the outer end thereof. The motor when energized drives a gear 31 by means of rotation of the worm, the gear being keyed to a vertical shaft 32 bearing-mounted in the torso. The shaft has a small diameter portion 35 to which matching cam lobes 36 and 37 are secured. From the rear, the two cam lobes together have a general configuration of a heart-shaped cam. The cam lobes are straddled by first and second pairs of fingers or cam followers 38 and 39 on one side and on the cam lobe 36 only the upper cam follower 40 is shown. The cam followers 38 and 39 are carried by a crank arm 42 and the cam follower 40 is carried by an identical crank arm 43. The cam lobes 38 and 39 are designed to move their associated crank arms 42 and 43, twelve and one-half degrees upwardly and twelve and one-half degrees downwardly from a midpoint between the extreme upper position, indicated by the broken line 44 and the extreme lower position, indicated by the broken line 47, by the rotation of the shaft 32. The crank arm 42 is fixedly mounted on a transverse crank shaft 48 which supports and drives one leg according to the movement of the crank arm. The crank shaft fixed to crank arm 43 is not shown.

The lower end of the rod 19 has a horizontal portion 49 extending through a bracket 50, carried by the crank arm 43. Crank arm 43 is moved upwardly and downwardly by the corresponding cam lobes; the rod 19 is also moved upwardly and downwardly to slightly rock the doll's heat to realistically simulate the movement of a child pedalling a tricycle.

The doll has a bottom portion of the torso seated on the tricycle seat 53 and the weight of the doll plus the gripping of the doll's hands on the handle 25 hold it steadily on the tricycle. Extending downwardly and rearwardly from the seat are frame members as 55 having a horizontal axle 56 supported therein and on which are mounted wheels 59, only one of the wheels and the frame members being shown. The seat portion 53 extends forwardly and upwardly extending from it is a rigid member 60 to which the handle 25 is secured.

Extending downwardly from the forward seat portion is a forked member 61 supporting an axle 62 for the large wheel 65 which rotates on the axle within the forked member.

The best view of the axle is shown in FIG. 2. It is formed of an inner hollow member 66 having a closure 67 at one end and a plug 68 in the other end. Surrounding the member 66 is a sleeve 71 forming a hub with which a disc member 72 of the wheel is integral. Also, integral with the disc member 72 is an inner cylindrical portion 73, shown in FIGS. 1-3. Formed radially inwardly of the cylindrical portion 73 and axially outwardly of the disc 72 are a pair of ratchet wheels 74 and 75, the wheels being separated by the disc 72. The ratchet wheels are identical having teeth 76, positioned to receive pawl ends 77 and 78 in the same direction.

The ratchet wheels are enclosed by discs 79 and 80, each having an inner axially directed annular flange 84 and 83 supported on the sleeve member 71. Extending axially inwardly from the disc 79 is a pin 85 and extending axially inwardly from the disc 80 is a similar pin 86, the pins being adapted for pivotally mounting the structures 89 and 90, on which the pawl ends 77 and 78 are formed, respectively. The structures 89 and 90 are identical and their pivot pins are 40° apart. The pawl structures are generally triangular, as best seen in FIG. 3, for strength purposes and extending from the long leg as 91 of the right angle pawl structure 89 is means comprising a U-shaped resilient member 92, adapted to form a biasing member or spring to hold the pawl ends, at 77 and 78 in contact with a respective ratchet wheel. An inner leg 95 of the U-shaped spring member 92 rides during rotation of the wheels 65 on the sleeve 71, thereby exerting a spring force so as to hold the pawl ends in contact with the ratchet teeth. The ratchet structures 89 and 90 are made of a light weight and resilient plastic and provide a unique one piece pawl and biasing member.

Extending generally radially outwardly from the disc 79 is a pedal support member 96, having an opening 97 in which a pedal support axle 98 extends, as best seen in FIG. 2. Supported on the axle 98 is a pedal 100 having a stirrup 101 to hold the doll's foot thereon. In the same manner extending from the disc 80 is a pedal support member 102 having an axle 103 supported at its outer ends. A pedal 106 is supported on the axle and a stirrup 107 is secured to the pedal.

Referring again to FIG. 1, extending forwardly from the torso are upper leg portions 108, only one being shown. The outer leg is pivoted on its crank shaft 48, fixed to the crank arm 42. The crank shaft 48 extends into the leg and has a spring thereon to hold the leg in various positions in which it is latched by means of a detent, not shown. Both legs are similarly secured, and on the crank arm 43 for the leg portion not shown, there is a crank shaft fixed thereto equivalent to the shaft 48. The leg portion 108 is held in its present position by means of the aforesaid detent and spring and can be moved to various other positions against the force of the spring.

A lower leg portion 110 is secured to the upper leg portion by pivot 109, the pivot arrangement providing a free floating knee action. The foot 112 of the leg portion 110 is on the pedal 100 and is removably secured thereon by the stirrup 101. The other lower leg portion 113 shown in broken lines has its foot 114 on the pedal 106 and in the stirrup 107.

In operation the rotation of the cam lobes 36 and 37 on the shaft portion 35 cause reciprocation of the crank arms 42 and 43 so that the upper leg portions alternate between the positions indicated by the broken lines 44 and 47. The downward movement as indicated by the line 47 causes the leg to be extended and substantially straightened, with less of a knee bend at the lower position of the pivot 109 than at the upper position 109'. Extending from the latter pivots are broken lines 115 and 116 which indicate the two possible positions for the lower leg.

In FIGS. 1 and 3, the position of the pedal 100 and its support arm 96 are shown to be in the lowest position with respect to the wheel 65 and that of the possible downward leg movement of either leg. In FIG. 3 the movement of the pedal support 96 has rotated the wheel 65 and the disc 79 carrying the pawl 77 to its lowest or most extended position. During this movement the pawl 77 was engaged with the teeth of the ratchet 75 so as to cause the driving of the plate 79, of the ratchet wheel and the wheel 65 in the forward direction. During this driving movement, the other pedal 106 was raised with respect to the wheel as the other leg 113 was raised by means of the upward movement of the upper leg and the substantial knee bend indicated by the lines 44 and 116. During this movement the pedal support 102 was moved to the position which is shown in FIGS. 1 and 3 and as indicated by the arrows having broken lines in FIG. 3. During this movement the foot 114 and the stirrup 107 rotated the support 102 and the disc 80 so as to reset the pedal 106 to its upper position from which it can drive the wheel 65 on the next downward movement. During the travel of the disc 80, the pawl 78 was cammed over the ratchet teeth. This movement is of a free return of the pedal 106 upwardly and is a non-driving pedal movement. The driving movement of the pedals occurring in the downward motion as either of the legs are moved downwardly to the position of the lines 47 and 115. Then as the pedal 106 is in position to be moved downwardly, as shown in FIGS. 1 and 3, the movement of the foot 114 downwardly drives the disc 80 with the pawl in the ratchet so as to rotate the wheel 65 and at the same time the pedal 100 and its support 96 rotates the disc 79 upwardly with the pawl 77 moving away from the direction of the rotation of the teeth.

The angular movement of the pedals is approximately 40° and this is the predetermined limited driving and resetting movement of the pedals. This limited driving movement is completely adequate to provide a realistic operation of the tricycle by the doll.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example.

What is claimed is:

1. A figure toy, such as a doll in combination with a wheel driven toy, comprising:
   a figure toy having two legs and a body,
   said legs having an upper and a lower portion;
   respective pivot means joining each of the upper leg portions at one end thereof to the body;
   means within said body for driving each upper leg portion on said respective pivot means in opposite directions, alternately as to the respective legs to impart thereto a pedaling motion;
   transverse pivot means joining the lower leg portions to the upper leg portions to provide a free floating knee action in each leg;
   reciprocable pedal means having driving connection to one of said wheels;
   a lower end of each lower leg portion removably engaging said pedal means for reciprocating the same in opposite directions;
   and one-way drive means operatively connected between said pedal means and said wheel to drive said wheel by movement of said pedal means in one direction to move said wheel toy when said upper leg portions are alternately moved in one of said opposite directions and said one-way drive means permitting said pedal means to move freely in a direction opposite said one direction when said upper leg portions are alternately moved in the other of said opposite directions.

2. The invention according to claim 1 in which said drive means comprises:
   ratchet and pawl means in said wheel for each pedal,
   each pawl being engaged in its respective ratchet when the corresponding pedal is in its driving movement and each pawl being disengaged from its respective ratchet to permit movement of the pawl with respect to the pawl and pedal when the corersponding pedal is in its non-driving movement.

3. In a pair of members adapted to rotate relative to each other on a common axis defined by a pivot member mounting said pair of members to each other, a ratchet pawl combination comprising:
   a ratchet wheel including teeth on one of said members;
   a pawl frame pivotally mounted at one end on the other of said members to be in engaging alignment with said ratchet teeth,
   another end of said frame defining said pawl, and
   means for oiasing said pawl comprising a U-shaped resilient flexible member fixed on said frame and having a portion thereof adapted to resiliently engage said pivot member to bias said pawl into contact with the ratchet teeth.

References Cited

UNITED STATES PATENTS

| 1,042,294 | 10/1912 | Torluemke | 46—109 |
| 2,896,371 | 7/1959 | Ardolino | 46—102 |
| 3,225,491 | 12/1965 | Oberg | 46—245 |
| 2,864,260 | 12/1958 | Nicolaus | 74—142 |

FOREIGN PATENTS 60,365  2/1960  Italy.

F. BARRY SHAY, Primary Examiner

U.S. Cl. X.R.

46—247; 74—142